(12) United States Patent
Fokkelman

(10) Patent No.: US 9,626,857 B2
(45) Date of Patent: Apr. 18, 2017

(54) SYSTEM FOR TRANSMITTING BAGGAGE ITEMS

(71) Applicant: Joris Fokkelman, Tegernheim (DE)

(72) Inventor: Joris Fokkelman, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/760,975

(22) PCT Filed: Dec. 11, 2013

(86) PCT No.: PCT/EP2013/076177
§ 371 (c)(1),
(2) Date: Jul. 14, 2015

(87) PCT Pub. No.: WO2014/108267
PCT Pub. Date: Jul. 17, 2014

(65) Prior Publication Data
US 2016/0019775 A1   Jan. 21, 2016

(30) Foreign Application Priority Data
Jan. 14, 2013   (DE) .................. 10 2013 200 430

(51) Int. Cl.
*G08B 1/08* (2006.01)
*G08B 21/24* (2006.01)
(Continued)

(52) U.S. Cl.
CPC .......... *G08B 21/24* (2013.01); *B60R 25/1004* (2013.01); *B60R 25/2018* (2013.01);
(Continued)

(58) Field of Classification Search
CPC . B60R 25/2018; B60R 25/1004; H04L 12/12; H04L 63/0853; G06Q 10/083
(Continued)

(56) References Cited

U.S. PATENT DOCUMENTS

| 5,615,625 A | 4/1997 | Cassidy et al. |
| 6,934,855 B1 * | 8/2005 | Kipnis ................. G06Q 20/341 235/382 |

(Continued)

FOREIGN PATENT DOCUMENTS

| DE | 199 53 622 | 5/2001 |
| DE | 10 2005 035 230 | 7/2006 |

(Continued)

OTHER PUBLICATIONS

Barrier Kirk: "Connected Vehicles: an executive overview of the status and trends" Nov. 21, 2011, XP055070786.

(Continued)

*Primary Examiner* — John A Tweel, Jr.
(74) *Attorney, Agent, or Firm* — Cozen O'Connor

(57) ABSTRACT

A system for transmitting baggage items in vehicles, having a first communication module for communicating with a communication terminal that requests authorization data via a network, an identification routine that identifies a supplier, a second communication module for communication to a control device of an access system for a vehicle, a second identification routine for identification of the system by the access system, a third communication module for receiving request information (AA) from the driver, and an updating routine for updating authorization data of the system. A baggage detection unit detects baggage items loaded into the vehicle. Data regarding the baggage items is transmitted to a logistics service provider and after executing the updating routine transmits information on the baggage items to the vehicle access system. The control device of the access system generates a message regarding the transmission of baggage items via a bus system in the vehicle.

16 Claims, 5 Drawing Sheets

(51) Int. Cl.
*B60R 25/20* (2013.01)
*B60R 25/10* (2013.01)
*G06Q 10/08* (2012.01)
*H04B 5/00* (2006.01)
*H04W 12/06* (2009.01)

(52) U.S. Cl.
CPC ......... *G06Q 10/083* (2013.01); *H04B 5/0062* (2013.01); *H04W 12/06* (2013.01)

(58) Field of Classification Search
USPC ............ 340/539.32, 539.13, 425.5; 235/382; 713/185; 726/4
See application file for complete search history.

(56) References Cited

U.S. PATENT DOCUMENTS

| | | | | |
|---|---|---|---|---|
| 7,170,998 | B2* | 1/2007 | McLintock | G07C 9/00103 340/5.23 |
| 7,397,363 | B2* | 7/2008 | Joao | B60R 25/102 307/10.2 |
| 7,594,120 | B2* | 9/2009 | Brown | 707/999.001 |
| 7,934,251 | B2* | 4/2011 | Hesselink | H04L 63/0209 707/609 |
| 2005/0030151 | A1* | 2/2005 | Singh | B60R 25/1004 340/5.8 |
| 2006/0290319 | A1 | 12/2006 | Burgan et al. | |
| 2007/0143825 | A1* | 6/2007 | Goffin | H04L 63/08 726/2 |
| 2008/0066186 | A1* | 3/2008 | Hammes | B60R 25/2018 726/27 |
| 2012/0007741 | A1 | 1/2012 | Laffey et al. | |

FOREIGN PATENT DOCUMENTS

| | | |
|---|---|---|
| DE | 10 2007 009 741 | 10/2007 |
| DE | 10 2006 042 358 | 3/2008 |
| WO | WO 2008/088817 | 7/2008 |
| WO | WO 2011/147893 | 12/2011 |

OTHER PUBLICATIONS

"Telematics" Jan. 13, 2013, XP055108852.
"Bag tag" Dec. 2, 2012, XP055108833.
"Smart label" Nov. 20, 2012, XP055108836.
Benin "Radio Frequency Identification (RFID) Tags & Their Implication to Container Security", INTA 8803N. International Security Seminar, Sam Nunn Security Program; Apr. 13, 2004.

* cited by examiner

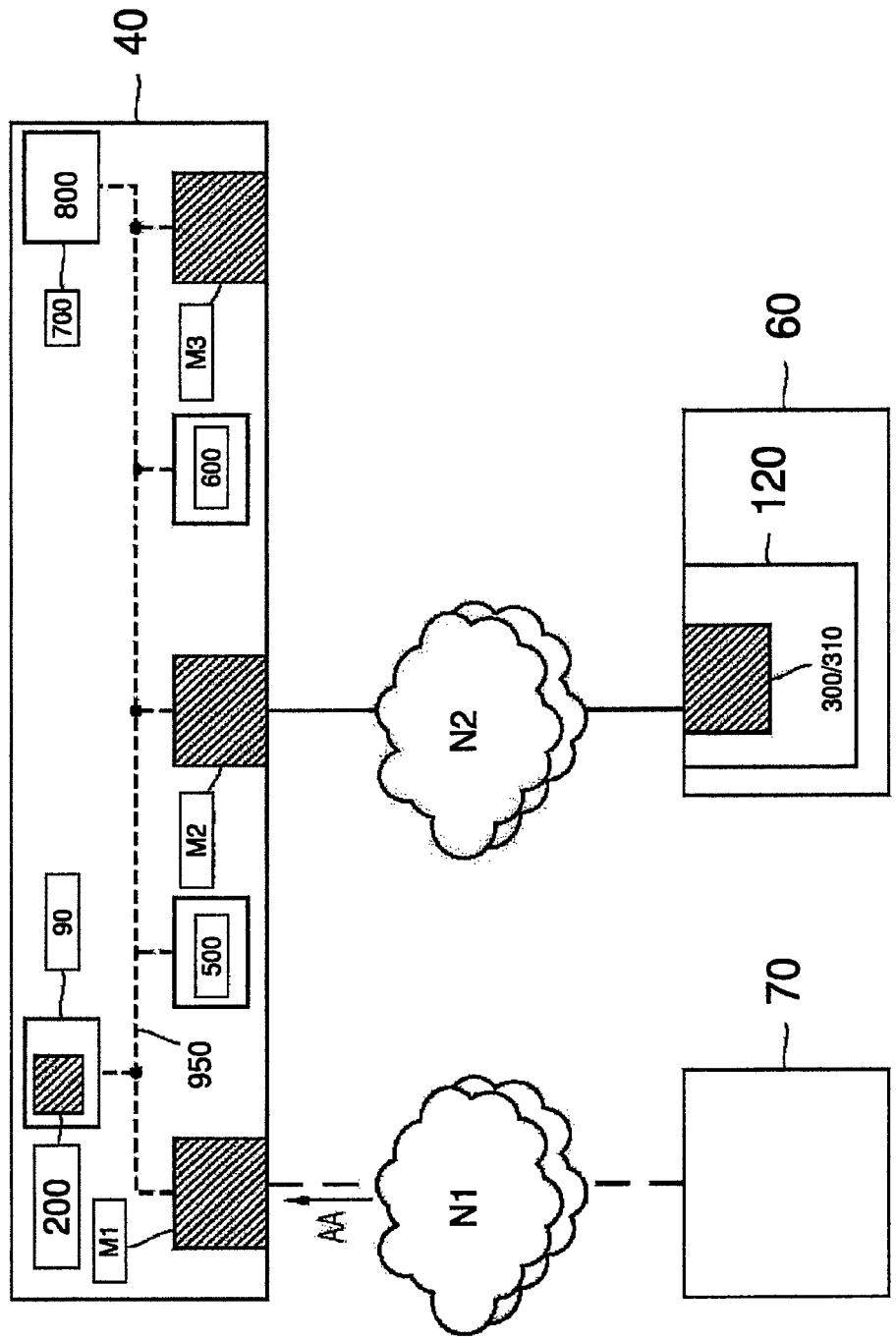

SYSTEM FOR TRANSMITTING BAGGAGE ITEMS

CROSS REFERENCE TO RELATED APPLICATION

This is a U.S. national stage of application No. PCT/EP2013/076177, filed on Dec. 11, 2013. Priority is claimed on German Application No. DE102013200430.3, filed Jan. 14, 2013, the content of which is incorporated herein by reference.

BACKGROUND OF THE INVENTION

1. Field of the Invention

The present invention relates to a system for transmitting baggage items.

2. Detailed Description of Prior Art

Delivery service and logistics service providers that have to distribute or collect baggage items or consignments, such as packages or letters, incur considerable expense to travel from one delivery address to another, as a result of which a large amount of time passes and the driving profiles for the delivery vehicles are quite unfavorable.

DE 10 2007 009 741 A1 describes that important items in the vehicle are provided with RFID tags and a warning is emitted if specific items are forgotten when the vehicle is left.

US 2006 0 290 319 A1 (Motorola) describes that a presence of a portable device in the loading station is recognized and an indication is provided if a device is still located in a loading station.

US 2012 0 007 741 A1 discloses that a query/input takes place with regard to what has been placed in the vehicle.

Vehicles are now often equipped with "keyless entry access units" that enable the vehicle to be locked/unlocked from outside via radio. A control unit located in the motor vehicle is required for this purpose. The control unit communicates via radio signals with an external unit, which is usually integrated into a key or into an authorization card for the vehicle. The control unit located in the vehicle and the external unit, also referred to as the external identification unit, which the driver of the vehicle normally carries with him, establish radio contact after both have been activated. Both units then exchange data containing a stored code via radio. If this code matches between the identification unit and the control unit, the vehicle is opened or locked by the authorized driver.

If baggage is to be taken at the end of a journey from an aircraft or cruise ship to a vehicle, all bags and suitcases must usually be taken quite a long distance to the parked vehicle. This normally involves passing through a confusing airport site or port area.

SUMMARY OF THE INVENTION

An object of one embodiment of the invention is to take the baggage at the beginning of the journey directly from the vehicle to the ship or aircraft and at the end of a journey from the aircraft hold or ship cargo hold to the vehicle.

One design of the system for transmitting baggage items, comprises a first communication module for establishing a communication connection to a communication terminal of a deliverer that requests authorization data via a communication network, a first identification routine for uniquely identifying a deliverer, a second communication module for establishing a communication connection via a wireless communication network to a communication device of a control device of the access arrangement of a vehicle, a second identification routine for the unique identification of the system by the access arrangement, a third communication module for receiving update request information of the driver, and an updating routine for updating authorization data in a memory of the system.

Using at least one baggage registration unit, baggage items are registered when loaded into the vehicle, the registered data relating to the baggage items are transmitted via a communication connection via a communication network or via a communication connection to a logistics service provider, the system, after executing the updating routine to update authorization data, information relating to the transmission of the baggage items to be effected is transmitted via a wireless communication network to the communication device of the control device of the access arrangement of the vehicle. The control device of the access arrangement of the vehicle generates a message relating to the transmission of the baggage items to be effected via a bus system in the vehicle to a driver assistance system.

In a further design, the system is characterized in that the baggage registration unit is fitted or arranged in the passenger compartment.

A further design of the system is characterized in that the baggage registration unit is fitted or arranged in the trunk.

A further particularly advantageous design of the system according to one embodiment of the invention is characterized in that the baggage registration unit has an RFID reader.

A further particularly advantageous design of the system according to one embodiment of the invention is characterized in that the bus system in the vehicle is a CAN bus.

A further particularly advantageous design of the system according to one embodiment of the invention is characterized in that the bus system in the vehicle is an Ethernet bus.

A further particularly advantageous design of the system according to one embodiment of the invention is that the wireless communication network is a mobile communication network.

A further particularly advantageous design of the system according to one embodiment of the invention provides for identifying the user by voice recognition, by transmission of identification information (PIN/TAN) or by a challenge-response method.

A further particularly advantageous design of the system according to one embodiment of the invention is that the user is identified through the use of unique cryptographic information.

A further particularly advantageous design of the system according to one embodiment of the invention is characterized in that a module is provided for establishing a communication connection via the wireless communication network via a mobile communication network and/or WLAN network.

A further particularly advantageous design of the system according to one embodiment of the invention is characterized in that elements are provided for encrypting the communication between the communication device of the system and the communication device of the access arrangement through the use of a common secret.

In one advantageous design of the system, the wireless communication network N2 is a mobile communication network. In a further particularly advantageous design of the system, a module are provided for identifying the user by voice recognition, by transmitting identification information (PIN/TAN) or by a challenge-response method.

A further design is characterized in that a module is provided for identifying the logistics service provider through the use of unique cryptographic information.

A particularly advantageous design of the system has elements for establishing a communication connection via the wireless communication network N2 via a mobile communication network and/or WLAN network which can also be designed as car-to-car or car-to-infrastructure communication.

In a further very secure embodiment, elements are provided for encrypting the communication between the communication device of the system and the communication device of the access arrangement through the use of a common secret.

One object is also achieved by the method for transmitting baggage items in vehicles. Here, a registration of the vehicle is carried out as a first step. A determination of the position of the vehicle is then effected, followed by a release of a position of the parked vehicle as the delivery address to the system via a communication device via a communication network. The position of the parked vehicle is transmitted via a communication unit via a communication network. Furthermore, the authorization release to open at least one door and/or a trunk of the vehicle is transmitted by a deliverer via a communication device of the system to a communication terminal of the deliverer, wherein the opening is valid within a defined time window. A transmission of a radio signal containing an authorization release, wherein, if authorization is given, the access arrangement is activated an opening of at least one door and/or a trunk of the vehicle, is carried out and, on completion of the opening and transmission of the baggage items, by the manual closing of the door and/or the trunk of the vehicle by the logistics service provider, a confirmation of the transmission of the baggage items is effected by the logistics service provider via the communication device via the communication network to the communication terminal of the driver via the system.

Following a transmission of an update request by the communication device of the driver, an updating of authorization data is performed in the control device of the access arrangement.

In one advantageous design, the notification of the delivery can be effected in that the vehicle informs the driver of the successful transmission or non-performance of the transmission of the baggage items within the predefined time window via the communication device as a data packet, SMS, email or other electronic notification. If the driver opens the vehicle, he receives, via the access arrangement, a short notification, which is presented audibly or visually on the screen of the communication terminal, indicating that a transmission of baggage items has been carried out or the baggage items were collected at a defined time. In the case of the output that a delivery has taken place, it is intended according to one embodiment of the invention that a warning is emitted when the driver leaves the vehicle, if, for example, delivered baggage items are still in the trunk. The driver is hereby intended to be reminded not to forget the delivered baggage items when leaving the vehicle.

In a further advantageous design, the performed delivery is confirmed in that the vehicle emits a confirmation to the system following a delivery and the locking of the trunk or doors in order to signal that the vehicle is once more locked.

If the vehicle is not locked once more in a time period, the communication terminal of the deliverer receives a warning notification via the system, indicating that the vehicle is not properly locked.

It is intended according to one embodiment of the invention that a visual, audible, sensory documentation of the delivery is effected with an on-board camera. For this purpose, it is intended that, when the vehicle is opened, cameras located in the vehicle and installed in the vehicle for this or other purposes take photos or make film recordings and are triggered by the access arrangement.

It is also intended that cameras are installed in the trunk. The use of cameras installed for blind-spot detection, parking assistance, support of adaptive restraint systems, sleep warning systems, or other purposes are controlled by the access arrangement when the trunk or doors are opened is particularly advantageous. The films or photos can avoid or shed light on any cases of misuse. Sensor values of acceleration sensors or so-called solid-borne sound sensors or microphone signals are similarly used for documentation purposes of the performed transmission of the baggage items.

In a further advantageous design, the position of a least one free parking space is calculated based on a car-to-car and/or a car-to-infrastructure communication on the basis of the current position of the vehicle and is transmitted to a navigation device of the vehicle. Here, the navigation device can transmit the position via the communication devices to the system.

A further design of the method according to one embodiment of the invention is characterized in that the position of the free parking space is transmitted to the navigation device when the vehicle is located in a predefined area in relation to the free parking space, preferably in the vicinity of a barrier of a parking facility.

A very advantageous design is characterized in that, following the parking of the vehicle on a selected free parking space, the position of the selected parking space is transmitted to a storage medium, preferably transportable by the driver, preferably to a key of the vehicle and/or a mobile telephone of the driver and/or a chip card, and is then stored on the storage medium and preferably additionally displayed.

One advantageous design is characterized in that the navigation device or the storage medium transmits the position of the selected parking space to the system via a parking space management system of the parking facility.

In a further design, when the selected parking space is left, the position of the parking space which is then free once more is transmitted to the system via the parking space management system.

In a further advantageous design, the position of the at least one free parking space is calculated from a measurement of the distance between at least one vehicle or at least one infrastructure element and other vehicles or other infrastructure elements which are arranged within a circle with a predefined radius around the vehicle looking for a free parking space.

One advantageous design is characterized in that further information on the parking space situation, preferably on residents' parking areas or no-parking areas, is transmitted by the at least one infrastructure element and/or is provided from a digital map of the navigation device and is used to calculate the position of the at least one free parking space.

In a further design, the deliverer is identified by voice recognition, by transmission of identification information (PIN/TAN) or by a challenge-response method. A further design is characterized in that the system is identified by the use of unique cryptographic information.

In a further particularly advantageous design, the communication connection is established via the wireless communication network N2 via a mobile communication network and/or WLAN network.

In a further advantageous design, the communication between a communication device of the system and the communication device of the access arrangement and the communication device of the deliverer is encrypted by using a common secret.

One advantage of the method according to one embodiment of the invention is that, by said method, a management of position locations of the vehicles to be located synergy effects are generated, since a high degree of automation for the transmission of baggage items to the relevant vehicles is effected. A reduced cost for the delivery time and energy consumption with all eco-friendly secondary effects is achieved for a delivery service by the invention.

A further aspect of the invention is that a communication connection is established between an authorized logistics service provider who receives the corresponding authorization data from the system according to the invention and the access device of the vehicle. If the system or the mobile terminal of the logistics service provider has been successfully identified, the authorization data are updated and activated accordingly in the control device of the access arrangement for the transmission procedure of the deliverer so that the consignment in the trunk or in the passenger compartment is permitted by means of the authorized approval of the opening of the vehicle doors or trunk lid by means of the control device for the deliverer so that the baggage items can be reliably transmitted here. According to the invention, the trunk is the space in the vehicle that is provided for the transportation of the luggage.

It is normally located in the rear area, though some vehicle types have it at the front. In motor vehicle technology, the passenger compartment refers to the space in which the vehicle occupants are located.

Furthermore, following its initiation by the driver, the method can be carried out in a fully automated manner by the system, i.e. quickly and without cost-incurring personnel deployment. Costs are also reduced through the use of an existing mobile infrastructure and the possibility of implementing this largely by means of commercially available server components. Moreover, the risk of incorrect inputs is minimized through the automation. A further advantage of the invention is the facility to be able to perform the updating of the authorization data directly via a mobile terminal of the driver and the deliverer.

The vehicle according to one embodiment of the invention offers a reliable and secure facility whereby a deliverer can, for example, open the trunk, but without critically jeopardizing anti-theft protection as a result. A variable-code method can be employed which can only be used in a time window and only by the deliverer, and which expires after a single use.

The vehicle or the driver registers via communication connections in an infrastructure unit, for example a parking lot management system, connected to the system according to the invention, wherein, in this registration, the system according to the invention is notified when and where the vehicle is parked in order to be able to receive a consignment via a deliverer. Here, it is advantageously ensured by the infrastructure and the resulting information service that the deliveries can be transmitted in an optimized manner through optimized grouping of consignments.

By the transmission of the authorization to open the vehicle concerned, it is also intended that, in the event of transmission of the authorization from the mobile terminal of the deliverer or the delivery vehicles networked therewith, all vehicles in the vicinity expecting a delivery respond to the radio signal generated by the deliverer with a light signal. The location by the deliverer is simplified as a result in order to find the vehicles concerned quickly, wherein, as already mentioned, the opening of the trunk or doors is possible only with the special individual variable code.

Further advantageous developments of the method according to the invention and the system for transmitting consignments can be found in the further claims.

BRIEF DESCRIPTION OF THE DRAWINGS

The method according to the invention is explained in detail below with reference to drawings, in which:

FIG. 5 shows a schematic representation of an arrangement for implementing the system.

DETAILED DESCRIPTION OF THE PRESENTLY PREFERRED EMBODIMENTS

Figure 1:
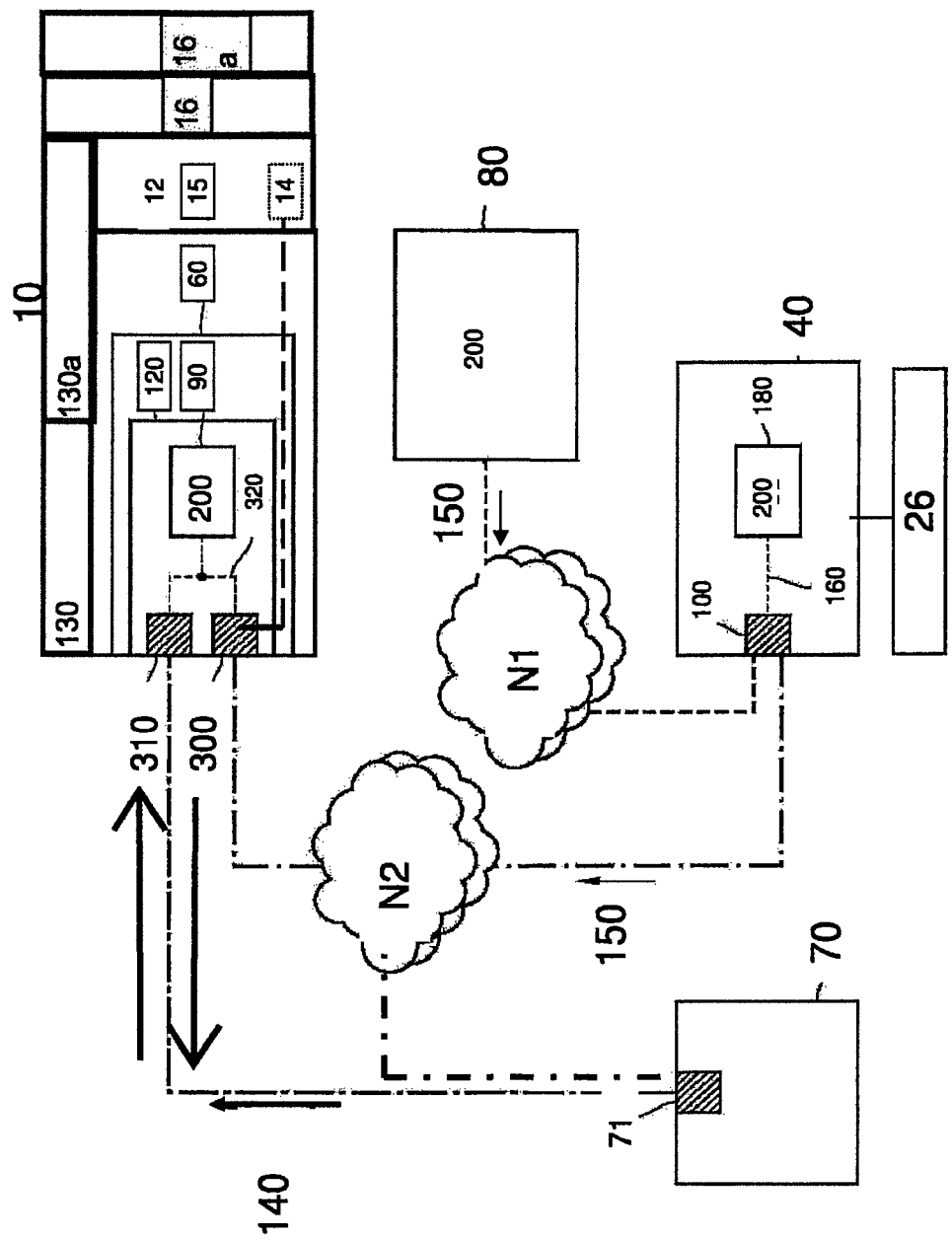
FIG. 1 shows schematically a vehicle with a communication device and a schematic representation of an arrangement for implementing the system.

A vehicle 10 shown in FIG. 1, for example an automobile or truck or other land-based vehicle, which is to be parked on a parking space is equipped with a positioning system, for example a GPS system 12 that contains a computing device 14 and a navigation device 15. The journey data is entered into the navigation device 15 by the driver before the start of the journey. The navigation device 15 is an integral component of a driver assistance system.

The vehicle 10 has an access arrangement 60. This access arrangement 60 has a control device 120. This control device 120 is connected via a communication device 300 to the communication network N2. The authorization data 200 of authorized deliverers of the access arrangement 60 are similarly stored in the control device 120 in a memory 90.

Driver assistance systems are electronic ancillary devices in vehicles to support the driver in specific driving situations. The focus here is often on safety aspects, but primarily on increasing driving comfort. These systems intervene partially autonomously or autonomously in drive, control (e.g. fuel, brake) or signaling devices of the vehicle or warn the driver by suitable man-machine interfaces shortly before or during critical situations. Driver assistance systems of this type are, for example, parking assistance (sensor arrays for obstacle and distance detection) braking assistant (BAS), cruise control, adaptive cruise control (ACC), distance warning system, turning assistant, congestion assistant, lane detection system, lane keeping assistant/lane assistant, lane departure warning (LDW), lane keeping support, lane change assistance, lane change support, intelligent speed adaptation (ISA), adaptive cornering lighting, tire pressure monitoring system, driver drowsiness detection, traffic sign recognition, platooning, automatic emergency braking (AEB), high and low beam assistant for the headlights, night vision.

The input of the journey data by the driver involves, on the one hand, the arrival and departure data and, on the other hand, the entire route guidance to the airport or port and accompanying baggage items.

FIG. 1 shows a system 40 for transmitting baggage items. The number of baggage items and the weight of the items may be input according to one embodiment of the invention by a man-machine interface that is connected to the navigation device 15, e.g. in the passenger compartment and/or in the trunk. By this input, on delivery or departure from the airport or port, the scope and condition, such as the quantity, size and weight, are registered in advance by this input by the driver for the logistics service.

Alternatively, the baggage items can be registered via the baggage registration unit 16 which is disposed in the trunk and/or in the passenger compartment. To do this, there are a plurality of alternatives according to one embodiment of the invention. In one design, the registration can be effected via a manual input via a man-machine interface (not shown in the drawing) linked to a driver assistance system and is carried in the trunk. The input can be effected via a keyboard, which may be designed mechanically and also electronically. Along with the keyboard, the baggage registration unit 16 has a barcode and/or an RFID reader.

When the RFID reader is used, it is necessary for the baggage items or the delivery goods to be provided in each case with an RFID tag on which metadata, such as e.g. the weight, size, dimensions, departure time, departure location, arrival time, arrival location is stored in profiled form. All possible additional transport charges are thereby advantageously at least determined in advance and agreed with the customer or driver or ideally are even already paid by the driver via the communication connection 300 via a secure communication connection. Logistics planning is carried out on the basis of the required departure and arrival dates, delivery dates, delivery locations, baggage item or delivery goods volumes.

Along with the profiled metadata which is combined as data packets, the radio signal may further include a vehicle identification, which may comprise the vehicle color, vehicle type, vehicle registration number, a digital identification code or a telephone number as a first data element, the vehicle position or a URL to a service, such as an IP-based parking space management system 26, where the vehicle position can be retrieved, as a second data element, an access code which enables profiled access for the deliverer, but does not give any driving authorization and loses its validity after a defined time, as a third data element. Alternatively, further data fields are assigned, such as "Search code", "Approval for door opening", "Refrigeration of the consignment required after opening of the vehicle".

On collection from the port or airport, the condition of the baggage items is not usually known in advance to the logistics service. This can substantially disrupt the logistics planning if, for example, a very large number of very large baggage items have to be transported. A check is carried out here according to the invention to determine whether the capacity of the vehicle is adequate and furthermore a departure deadline must be met in order to include, for example, a time-consuming stowage of many baggage items accordingly in the calculation.

Similarly, in the case of condition-related, variable charges, e.g. a surcharge for excess weight in the case of air travel, the charges are not yet specified and are not yet agreed with or paid by the driver or customer.

Furthermore, the baggage items that are to be collected are identified without doubt by the logistics service, and this applies in particular in the case where a plurality of items are collected by a plurality of service providers, such as e.g. the division whereby the baggage service is to collect the suitcase/travel bag for the journey and a laundry service later collects a bag full of dirty laundry.

When the service is reserved, these data are similarly indicated and may assume the following form:
1 suitcase/grey/100×50×25 cm/25 kg;
1 suitcase/green/70×35×15 cm/12 kg
and corresponding labels enabling an identification are printed out.

A further alternative for the unique identification of the baggage items is characterized in that the baggage items are provided e.g. with an RFID chip and, on reservation of the service, the code of the RFID chip of the respective baggage item is affixed by the logistics service provider. The chip is ideally permanently built into the baggage item, as a result of which a fixed reference to specific characteristics of the baggage item exists, e.g. dimensions, which can also be transmitted during the reservation. The corresponding baggage item can be uniquely identified with an RFID reader on collection.

Furthermore, the baggage registration unit 16 in the vehicle can check whether the baggage item is present and is also collected with the correct collection action. If the logistics service removes an incorrect baggage item, this can be recognized immediately by the RFID reader and the mistake can be indicated. "Incorrect baggage item—Please put back!"

It is similarly intended according to one embodiment of the invention that the position of the baggage item is determined by one or more RFID reading devices in the vehicle and an access authorization is accordingly extended or restricted independently by the vehicle without a further transmission of access authorizations to the logistics service having to take place.

This is particularly advantageous in the case where, for example, it was planned that all baggage items were to be placed in the trunk and the latter was to be opened only by the logistics service, but the travel bag is located on the back seat, as a result of which access to the passenger compartment is required on collection.

Alternatively, the modified access authorization can be transmitted with the transmission of the parking position of the vehicle and, for this purpose, for reasons of security, an encryption or only partial information which grants access to the vehicle only in conjunction with further information or a secret securely transmitted during the reservation.

In a further alternative for registering and transmitting the actual weight of the baggage items, it is provided that, if the baggage item has an RFID chip and the baggage registration unit 16 of the vehicle has an RFID reading device and a device for monitoring the permitted maximum weight which is integrated into the baggage registration unit 16, the respective baggage item can be identified during the loading of the vehicle and its weight can be determined. When the parking position is transmitted, the weight of the baggage items can therefore also be transmitted. This solution is particularly advantageous for airports since, on detection of excess weight, the traveler is informed on check-in of a surcharge or can pay this surcharge automatically immediately on registration and synchronization of the transmitted baggage data, resulting in a time saving at the airport for the traveler and the airport operator.

To do this, an updating of authorization data 200 of an access arrangement 60 of a vehicle 10 and a communication terminal 70 of the logistics service provider is carried out. The system 40 may be a server-based solution which has the usual components and peripherals, such as a processor, memory, network connection, operating system, application software, etc. (not shown). In addition, a first communication network N1 and a second communication network N2 are illustrated.

The communication terminal 70 of the deliverer is, for example, a mobile communication terminal, a multifunctional Smartphone, a chip card or a similarly radiocommunication-enabled terminal with a memory that has at least one communication device 71. The system 40 has a communication device 100 via which the system 40 can communicate with both the communication network N1 and the communication network N2. Furthermore, the communication device 100 is connected into the system 40 via a data bus 160 with a data module 180 using relevant communication protocols. The authorization data 200 were originally allocated or managed by this data module 180 or a different enabled device.

The communication terminal 80 of the driver is similarly connected to the communication network N1, for example wirelessly.

The mobile communication terminal or communication terminal of the deliverer 70 which also has a communication device 71 is furthermore shown. It is possible to transmit a coded and encrypted radio signal 140 to a communication device 310 of the control device 120 of the access arrangement 60 by this mobile terminal, via the latter's communication device 71. A radio signal is understood to mean a communication signal that is based on electromagnetic signals, including optical signals (e.g. infrared light). The vehicle 10 responds to a defined encrypted radio signal 140 of the communication terminal 70 of the deliverer which is preferably limited to a defined time window and is invalidated after the use of the opening command. The radio signal 140 gives an access authorization, but no driving authorization to start the vehicle. An active alarm system (not shown in the drawing) is modified according to the invention for the time period of the authorized transmission of the baggage items into the vehicle 10 in such a way that no alarm is triggered.

Various functions of the access arrangement 60 can be triggered by the radio signal 140. This may, for example, be the opening or closing of the door lock or the trunk lock. Defined information is allocated to the communication terminal 70 of the logistics service provider and is stored, and defined user data 200 are assigned to the control device 120, for example by the data module 180 of the system, and are stored. Said information and data enable the operation of the access arrangement 60 of a defined vehicle 10 only with a defined communication terminal 70 of the deliverer. The memory 90 and the communication devices 300 and 310 are interconnected via a data bus 320 using relevant communication protocols.

Data packets, which may comprise a vehicle identification, the vehicle color, vehicle type, vehicle registration number, a digital identification code, or a telephone number as a first data element, the vehicle position or a URL to a service, such as an IP-based parking space management system 26, where the vehicle position can be retrieved, as a second data element, an access code which enables profiled access for the deliverer, but does not give any driving authorization and loses its validity after a defined time, as a third data element. Alternatively, further data fields are assigned, such as "Search code", "Approval for door opening", "Refrigeration of the consignment required after opening of the vehicle".

The communication terminal 80 of the driver, which is similarly a cellphone, Smartphone, multifunctional automobile key or chip card, contains or receives from the vehicle 10 via the system 40 a defined number of access codes which can be used, for example, by the driver when shopping. If the driver wishes to pay for something and have it delivered, an access code of the vehicle 10 is communicated by the communication terminal 70 of the driver to a device at the checkout of the retail outlet concerned to the system 40 via the communication network N1 or N2. Here, the access codes may have a validity time period of several hours and can no longer be used when this time period expires.

In this alternative of the allocation of the authorization, the vehicle 10 does not necessarily have to be networked directly with the environment. The access codes prepared in the communication terminal 80 of the driver receive the validity on exit, wherein the time period of the exit time+X hours is defined, wherein X hours is the time duration of the stay on the car park for the duration of the shopping, which the driver predefines and enters via a man-machine interface (MMI) of the vehicle 10 (not shown) and which is then transmitted to the communication device of the driver 80.

After the unique identification of the authorized deliverer has been carried out, the authorization data 200 will establish a communication connection from the communication device 100 of the system 40 via the communication network N2 to the communication device 300 of the control device of the access arrangement 60.

The communication terminal 70 of the deliverer is now uniquely identified by the control device 120 of the access arrangement 60. This can be performed, for example, through the use of a unique cryptographic key. It is not necessary for this step to be carried out temporally immediately after the identification of the deliverer and the definition of the update request.

One possibility for the identification or authentication of the communication terminal 70 of the deliverer by the control device 120 of the access arrangement 60 is, for example, a challenge-response method. A prerequisite here is that the control device 120 of the access arrangement 60 and the communication terminal 70 of the deliverer have a common cryptographic secret. This secret is appropriately generated during the first login/registration of the driver on the system 40, either by the control device of the access arrangement 60 or by the system. The secret is then stored in the memory 90 in the control device 120 and in a memory 90 in the system. When the communication takes place between the communication terminal 70 of the deliverer and the control device SG via the communication network N2, the control device 120 will transmit a request (challenge) to the system and the communication terminal 70 of the deliverer via the communication network N2, from which the system and the communication terminal 70 of the deliverer calculate the answer (response) using the cryptographic secret and transmit it back via the communication network N2 to the control device SG of the access arrangement 60. This method additionally has the advantage that the following further communication between the system, the communication terminal 70 of the deliverer and the control device 120 can also take place in encrypted form via the communication network N2 for the transmission of the update request 700 using the common secret and there is therefore no prerequisite for the protocols per se running via the communication network N2 to offer adequate data security.

The simpler method for the identification and authentication of the system by the control device SG of the access arrangement 60 is the use of a PIN code, if necessary in conjunction with a single-use TAN code. These codes i.e. the PIN and, if necessary, a sufficient quantity of TAN codes, are appropriately generated during the first login/registration of the driver on the system 40, either by the control device 120 of the access arrangement 60 or by the system 40, and are stored in the memory 90 of the control device 120 and in the system 40. Here, the communication takes place in unencrypted form and the protocols running via the communication network N are therefore required to offer adequate data security.

Alternatively, the radio signal can be divided between the communication terminal 80 of the driver and the communication terminal of the deliverer 70 such that the data packets transmitted between the driver and the deliverer are stored in the access arrangement 60 so that the data packet is partially transmitted by the driver's cellphone or email or comparable technology, is partially stored with the deliverer and the two partial packets produce an access code or authorization data 200 only in conjunction with one another. This method advantageously prevents an access code from being intercepted during the transmission and prevents the vehicle 10 from being opened without authorization.

In one variant of this method, no identification data is stored by the system 40 itself. Instead, after establishing the communication between the system and the control device 120, the system 40 transmits the identification data of the deliverer to the control device 120.

In this case, the identification data (PIN code or TAN code) are stored on the one hand in the memory SP of the control device 120. On the other hand, they are known to the deliverer or, for example, are stored in a memory 90 in its communication terminal 70.

After the unique identification of the system 40 to the control device 60 has taken place, the update request 700 of the driver is transmitted from the communication device 100 of the system via the communication network N2 to the communication device 300 of the control device 60. An update of the authorization data 200 in the memory 90 of the control device 120 of the access arrangement 60 is then performed according to the update request 700.

Figure 2:
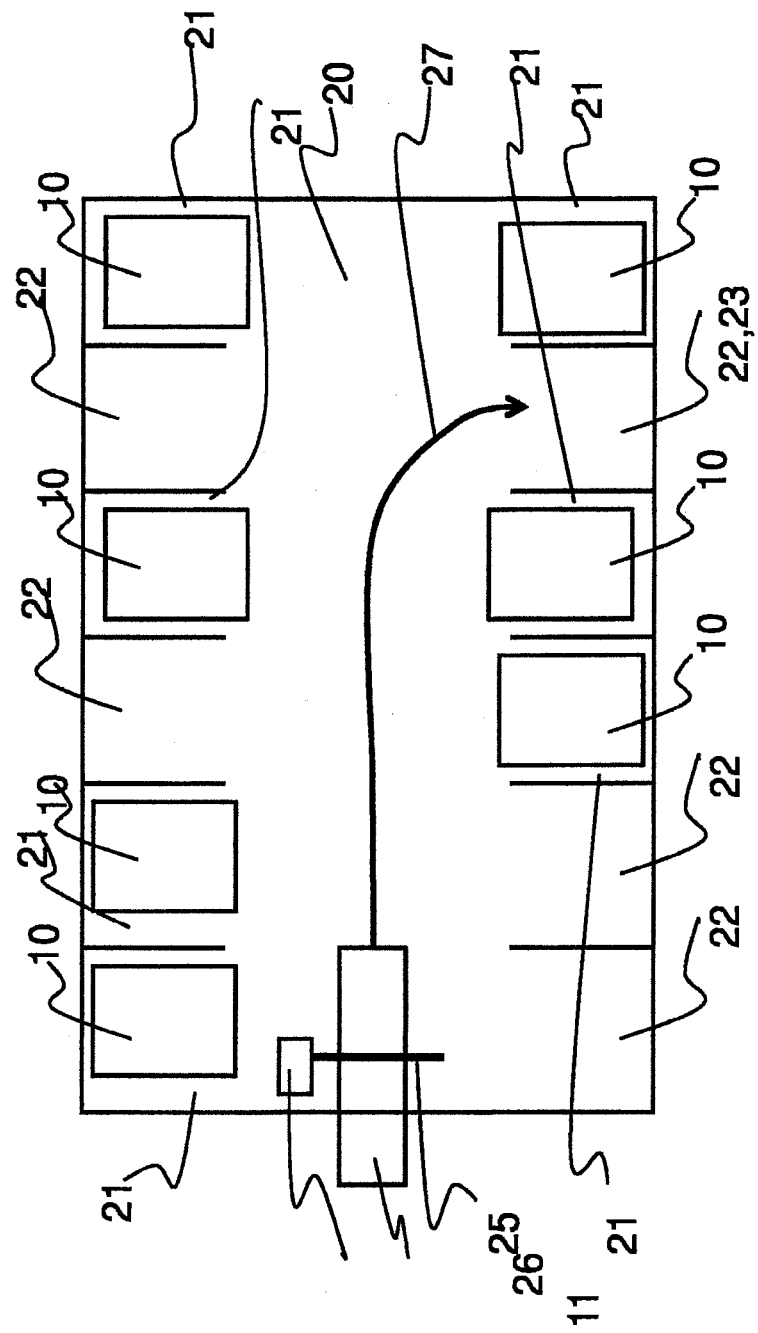
FIG. 2 shows schematically a first example embodiment of the use of the system in a parking facility.

FIG. 2 shows a vehicle looking for a parking space.

When an incoming vehicle 11 looks for a parking space in a parking facility, for example in a parking lot 20 shown in FIG. 2, the vehicle is initially located at an entry barrier 25 to the parking lot 20. The incoming vehicle 11 is equipped in a similar manner to the vehicle 10 shown in FIG. 1.

The parking lot 20 has parking spaces 21 occupied by vehicles 10. Conversely, the parking spaces 22 are free, so that they can be parked on.

At the entry barrier 25 to the parking lot 20, information indicating which parking spaces 22 are free is transmitted by short-range radio (e.g. infrared, Bluetooth, DSRC, ITS-G5, W-LAN, etc.) from the parking space management system 26 integrated into the entry barrier 25 to the computing device 14 of the vehicle 11 via the communication connection, i.e. by a car-to-infrastructure communication, via the communication devices 300/310.

The positions of the free parking spaces 22 may be indicated, for example, as absolute positions of the GPS system 12 or as relative positions, e.g. in relation to the position of the barrier 25.

Following the transmission of the information, the GPS system 12 is switched to so-called parking-lot mode. The computing device 14 then calculates the positions of the free parking spaces 22 in the reference system of the vehicle's own GPS system 12 on the basis of the data transmitted from the parking lot and presents these positions to the driver on a special display created for this mode. The driver can then select a parking space that is suitable for him for his vehicle 11 and can confirm the release of this position as a delivery location.

A route guidance to a parking space 23, for example selected by the driver, can then be determined by the navigation device 15 that receives the calculated position data from the computing device 14 and can be made available to the driver. The driver then moves with his vehicle on the basis of the calculated route guidance 27 to the selected parking space 23 and parks his vehicle 11 there. The route guidance is advantageous particularly in large, confusing and busy parking facilities, for example multi-story parking lots.

If the vehicle 11 is then parked in the parking lot on the selected parking space 23, the navigation device 15 of the vehicle 11 stores its position. This function can be triggered e.g. by the switching off of the engine at the position of the selected parking space 23. The navigation device 15 transmits the stored position of the now occupied parking space 23 to the memory 90 or via the communication device 300 to the system 40 and the key of the vehicle, to a mobile telephone of the driver or to a different device (e.g. a chip card) with a preferably wireless communication facility of the driver 80. The position of the parking space 23 can be displayed on request on the storage medium in the communication terminal 80 of the driver. As a result, the driver can relocate his vehicle 11 more quickly on his return to said vehicle.

The driver now leaves the parking lot 20. At the exit, the system 26 registers, e.g. by interrogating the storage medium, the parking space on which the vehicle 11 is parked. Since the storage medium has stored the position of the vehicle 11 or the selected parking space 23, it transfers this to the parking space management system 26 of the parking lot 20. It is now known to the parking space management system 26 that the parking space 23 selected by the driver, the position of which has been transmitted to the parking space management system 26, is occupied. The parking space management system 26 also transmits this position for verification to the system 40, since a further check is carried out to determine whether the vehicle is also located where the driver parked it during the confirmation as the delivery location.

After a time, the driver returns to the parking lot 20 to continue driving with his vehicle 11. Alternatively, the driver can also enter/set the alphanumeric parking marker indicated at the parking space which the driver recognized when parking the vehicle directly into the memory of his communication terminal 80.

In one preferred example embodiment, a multiplicity of read-out points exist in the parking lot 20, to which the position of the vehicle 11 can be transmitted from the storage medium. A read-out point of this type is located, for example at the barrier 25 and/or at the gates and/or the automated pay stations of the parking lot. At a read-out point of this type, the position of the vehicle 11 and, where appropriate, the route to it are displayed at the driver's request, so that the driver and can transmit his vehicle 11 the position of the parked vehicle to the delivery service and the driver can quickly relocate his vehicle. The position of the vehicle 11 on the parking space 23 stored in the navigation device 15 is preferably also used as the starting position for the next route calculated by the navigation device 15. The position of the parking space 23 that has become free is transmitted by the storage medium or the navigation device 15 via short-range radio to the parking lot management system 26 when the vehicle 11 exits. The parking lot management system 26 now knows that the corresponding parking space 23 on which the vehicle 11 had previously parked is again free.

Instead of the short-range communication with the parking lot management system 26, a communication to a corresponding parking lot management server via GPS, UMTS, LTE, WiMax, W-LAN, etc. can be effected.

The proposed method can be implemented with comparatively little technical outlay and without additional hardware in the vehicle.

Figure 3:
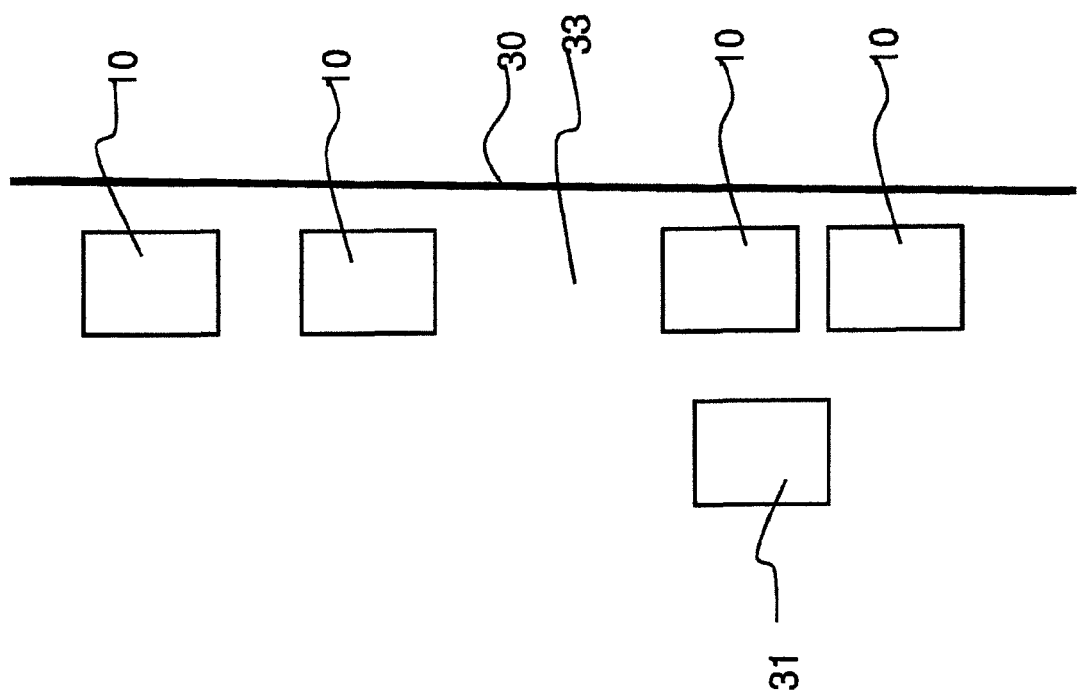
FIG. 3 shows a schematic representation of the system of an access arrangement.

In a further example embodiment, shown with reference to FIG. 3, it is explained how the position determination can be effected for the indication as the delivery location in the inner-city area of major conurbations.

The method shown by means of FIG. 3 serves to locate parking spaces, for example at the side 30 of a road, and thus to can be used to determine a delivery location. Many vehicles 10 corresponding to the vehicle 10 shown in FIG. 1 park here. The vehicle 31 looking for a parking space has a similar build.

In order to carry out the method according to the invention, it is advantageous if the vehicles 10, 31 have distance sensors fitted to the front, rear, or sides of the vehicles 10, 31 involved, such as, for example, ultrasound sensors, infrared sensors, radar sensors, cameras, etc. The computing unit 14 of the vehicles 10, 31 can furthermore carry out a car-to-car communication and/or car-to-infrastructure communication via the communication devices 300/310. A navigation device 15 is furthermore provided.

During the search for a parking space, the driver of the searching vehicle 31 initially establishes a connection via a button or a command with vehicles 10 within a circle with a predefined radius around the vehicle 31. As a result, the vehicles 10 already parking within the circle are "woken up" from a so-called sleep mode (inactive state) and are switched to the active state. The vehicles 10 that are now in the active state then measure the distances to the respective nearest vehicle 10 or to the nearest infrastructure device (not shown), for example a traffic light or a traffic sign, to the front, rear and/or sides.

The determined distance data of the vehicles 10 within the circle are transmitted by car-to-car communication to the computing device 14 of the vehicle 31 looking for a parking space. Furthermore, the positions of the respective vehicles 10 are transmitted to the computing device 14 of this vehicle 31. The computing device 14 of the GPS system 12 can now identify the respectively available parking space from information transmitted via C2C communication. If this space is large enough, the corresponding free area is designated as a parking space and is displayed to the driver as a parking space available for parking. In the situation shown in FIG. 3, the parking space 33 represents a parking space of this type. After the vehicle 10 has occupied the parking space, this position is transmitted via the communication device 300 from the GPS system 12 to the system 40.

The navigation device 15 can calculate the route from the current position of the vehicle 31 looking for a parking space to the free parking space 33 from the data determined by the computing device 14 and can make it available to the driver for fast location of the parking space. If a plurality of free parking spaces exist within the circle of the vehicle 31, they can be presented on a display of the computing device 14 so that the driver can select a parking space that is suitable for him.

Figure 4:
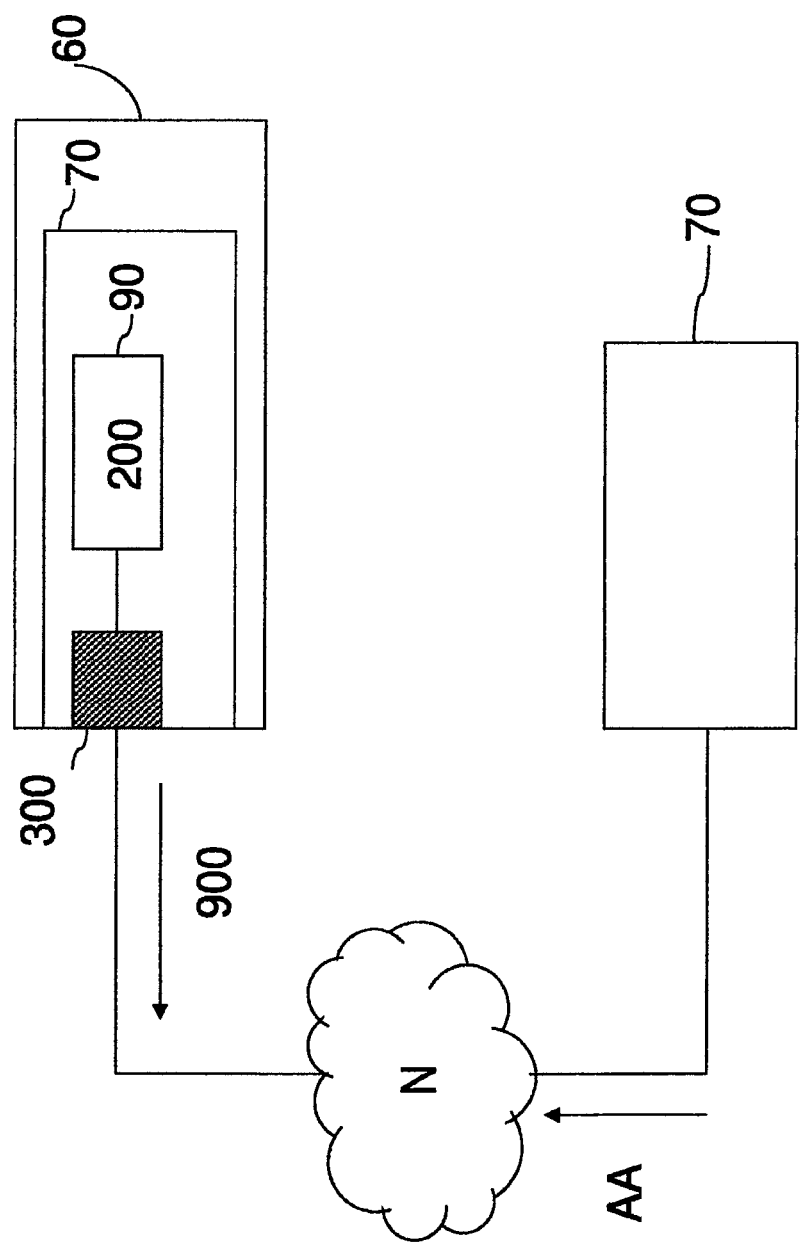
FIG. 4 shows a schematic representation of an arrangement of the system according to the invention in which the updating is initiated via a mobile telephone.

FIG. 4 shows a schematic representation of an access arrangement 60 of the method according to the invention in which the updating of the authorization data 200 is initiated via a mobile telephone 70 of a deliverer. A mobile communication network KN, the access arrangement 60, the control device 60, the memory SP and the communication device 300 of the control device 120 are also shown.

According to one embodiment of the invention, it is possible that the authorized deliverer can update the authorization data 200 of the access arrangement 60 even without the assistance of a service center. To do this, a connection is first established from the mobile terminal 70 of the authorized deliverer via the mobile communication network KN to the communication device 300/310 of the access arrangement 60. A unique identification of the authorized deliverer then takes place. This can be done in various ways. According to the invention, the control device 100 can generate an authorization code 900 and transmit it via the communication device 300/310, for example as a short message (SMS), to the mobile terminal 70 of the authorized deliverer. This authorization code 900 is stored in the mobile terminal 70 in a memory or on its SIM card (not shown). In the case of a required updating of the user data 200, this authorization code 900 must be transmitted back to the communication device 300. According to the invention, a two-part identification can then be performed. To do this, a check is first carried out to determine whether the authorization code 900 has been transmitted from a known mobile terminal 70 or its SIM card. If so, in a second step, the authorization code 900 transmitted from the mobile terminal 70 is then checked by the control device 120 of the access arrangement 60. If this check runs positively, the authorization data 200 are updated in the control device 120 according to the request 700, e.g. are deleted.

This method for identifying the deliverer can also be protected even further in that the communication device of the control device 300/310, after receiving the authorization code, transmits a request, for example as a short message (SMS), to an address (telephone number) of a mobile terminal previously stored in the control device 120 or in the communication device of the control device 310/300, which must then be confirmed within a time window, e.g. again by a short message, with an authorization code to the communication device of the control device 310/300.

A further possible identification method entails the use of a challenge-response method described in detail above, wherein a common secret is exchanged in advance between the control device 120 of the access arrangement 60 and the mobile terminal 70 of the deliverer or its SIM card. Here, the mobile terminal 70 of the deliverer must authenticate itself to the access arrangement 60.

The use of the method described above is advantageous not only for deleting user data 200 in the memory SP, but also for reactivating user data 200.

According to one embodiment of the invention, the described method can also be applied to RKE (remote keyless entry) keys or vehicle immobilizers.

FIG. 5 shows schematically a system for transmitting consignments. The system has a memory 90 and authorization data 200 stored therein. The memory 90 is connected via a data bus 950 to a first identification module which enables a first identification routine 500. A second identification module and an updating module 700 which enable a second identification 600 and an updating routine 800 are furthermore connected to this data bus 950. Finally, the system has at least three communication modules M1, M2 and M3. Via the first communication module M1, a communication connection can be established via a mobile communication network N1 from the communication terminal 70 of a deliverer. The second communication module M2 can establish a communication connection via a second communication network N2 to the control device 120 of the access arrangement 60 via the communication device 300/310 of said control device.

Again, it is possible according to the invention that the authorized deliverer establishes the authorization data 200 a communication connection by its communication terminal 70 to the system 40 via the latter's communication device 100. The communication-network-specific protocols of the communication network N1 are used here. The authorized deliverer is then identified by means of the first identification routine 500 using one of the identification methods described above. An update request 700 is then transmitted by the deliverer via its communication terminal 70 to the system. A mobile connection is then established via the second communication module M2 via the mobile communication network N2 to the control device 120 of the access arrangement 60 via its communication device 300/310 of said control device.

The system is now uniquely identified by the control device 120. The second identification routine 600 is used for this purpose. One of the identification methods described above can be used.

Once the identification is completed, an updating of the authorization data 200 takes place in both the control device 120 and the memory 90 of the system. The updating routine 800 is used for this purpose. The updating is carried out according to the update request 700 of the authorized deliverer.

Neither the method according to the invention nor the arrangement according to the invention is limited to the example embodiments, but can be used in all access arrangements, e.g. for buildings or electrical devices which have communication devices for communicating via communication networks. Here, the communication devices must be attuned to the communication networks and identification methods that are used.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system for facilitating transmitting of baggage items by a vehicle, the system comprising:

a first communication module configured to establish a communication connection with a communication terminal of a deliverer that requests authorization data via a communication network;

a first identification routine configured to uniquely identifying a specific deliverer;

a second communication module configured to establish a communication connection via a wireless communication network to a communication device of a control device of an access arrangement of the vehicle;

a second identification routine for unique identification of the system by the access arrangement, a third communication module configured to receive update request information of a user;

an updating routine configured to update authorization data in a memory; and at least one baggage registration unit configured to register the baggage items, to produce registered data relating to the baggage items, when the baggage items are loaded into the vehicle, the registered data relating to the baggage items being transmitted via the communication connection via the communication network or via a communication connection to a logistics service provider, wherein the system, after executing the updating routine to update authorization data, transmits information relating to the transmission of the baggage items to be effected via the wireless communication network to the communication device of the control device of the access arrangement of the vehicle, and wherein the control device of the access arrangement of the vehicle generates and sends a message relating to the transmission of the baggage items, the sending of the message to be effected via a bus system in the vehicle to a driver assistance system.

2. The system as claimed in claim 1, wherein the at least one baggage registration unit is arranged in a passenger compartment.

3. The system as claimed in claim 1, wherein the at least one baggage registration unit is arranged in a trunk.

4. The system as claimed in claim 2, wherein the at least one baggage registration unit has an RFID reader.

5. The system as claimed in claim 1, wherein the bus system in the vehicle is a CAN bus.

6. The system as claimed in claim 1, wherein the bus system in the vehicle is an Ethernet bus.

7. The system as claimed in claim 1, wherein the wireless communication network is a mobile communication network.

8. The system as claimed in claim 2, wherein the user is identified by at least one of voice recognition, transmission of identification information, and by a challenge-response method.

9. The system as claimed in claim 1, wherein m the user is identified by unique cryptographic information.

10. The system as claimed in claim 1, further comprising a module configured to establish a communication connection via at least one of the wireless communication network, a mobile communication network, and a WLAN network.

11. The system as claimed in claim 1, further comprising a module configured to encrypt communications between the communication device of the system and the communication device (300/310) of the access arrangement using a common secret.

12. The system as claimed in claim 3, wherein the at least one baggage registration unit has an RFID reader.

13. The system as claimed in claim 3, wherein the user is identified by at least one of voice recognition, transmission of identification information, and by a challenge-response method.

14. The system as claimed in claim 4, wherein the at least one baggage item includes an RFID component configured to be read by the RFID reader.

15. The system as claimed in claim 1, further comprising at least one of input device configured to document delivery of the at least one baggage item by creating one of a visual, audible, and sensory record.

16. The system as claimed in claim 15, wherein the input device is a camera arranged in the vehicle that is activated at least by the access arrangement.

\* \* \* \* \*